N. C. NELSON.
COMBINED HARVESTER.
APPLICATION FILED SEPT. 14, 1914.
1,255,209.
Patented Feb. 5, 1918.
3 SHEETS—SHEET 1.
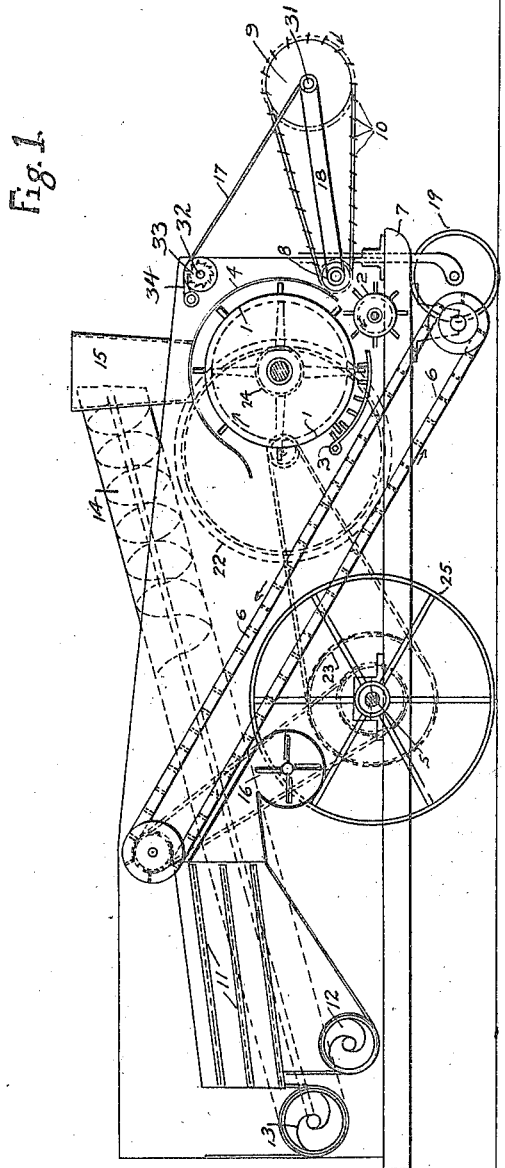
WITNESSES:
INVENTOR
Noah C. Nelson.

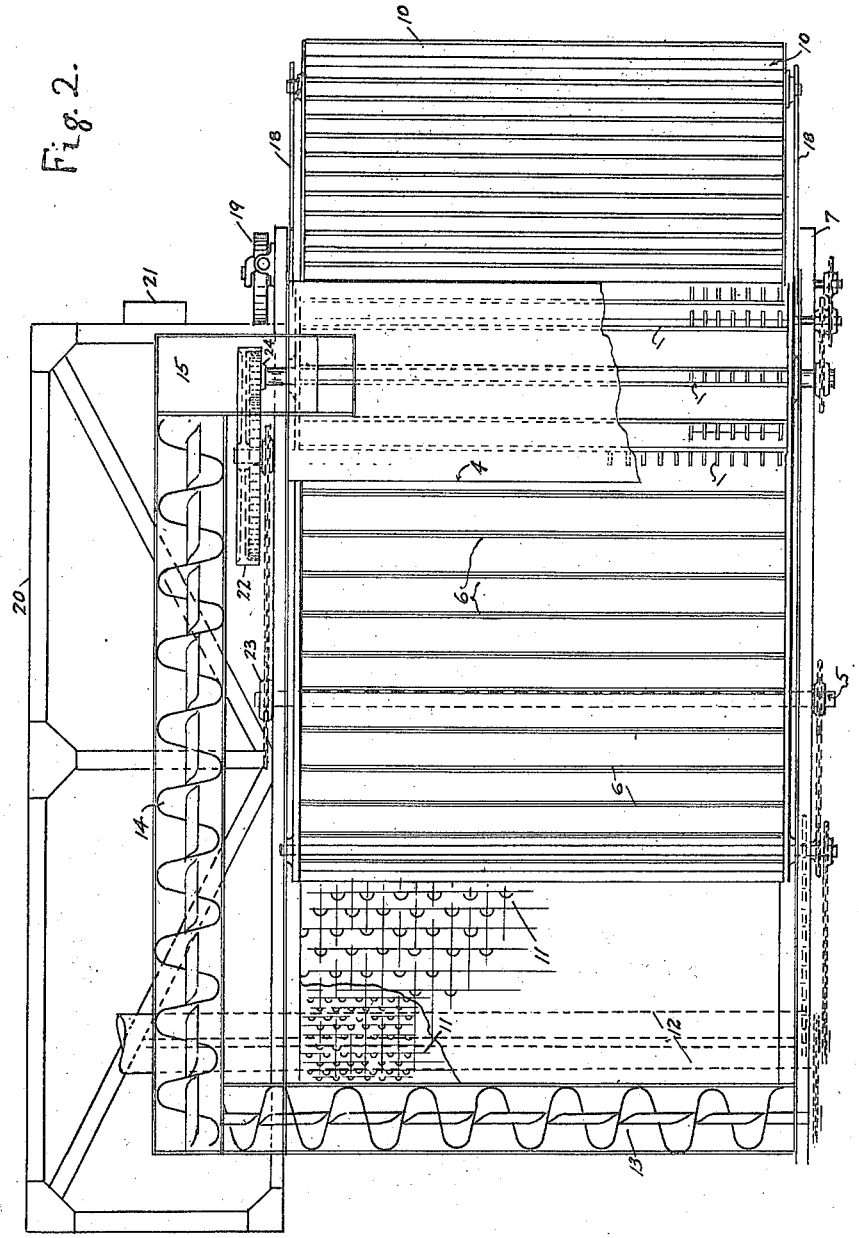

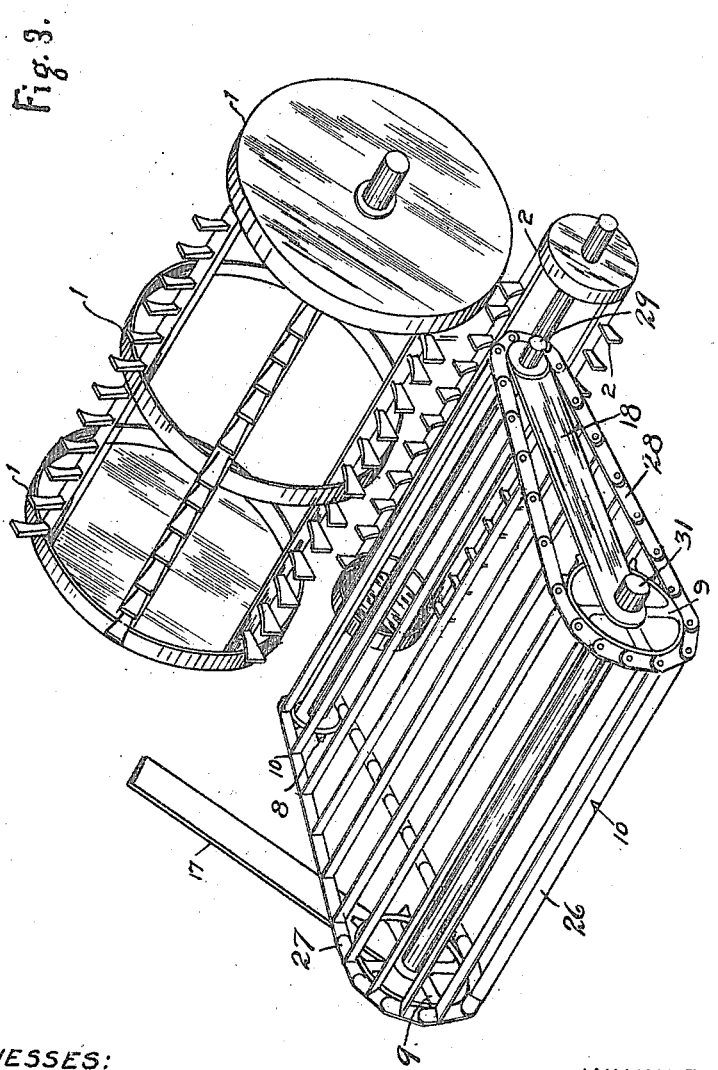

UNITED STATES PATENT OFFICE.

NOAH C. NELSON, OF IMPERIAL, CALIFORNIA.

COMBINED HARVESTER.

1,255,209.

Specification of Letters Patent.

Patented Feb. 5, 1918.

Application filed September 14, 1914. Serial No. 861,720.

*To all whom it may concern:*

Be it known that I, NOAH C. NELSON, a citizen of the United States, residing at Imperial, in the county of Imperial and State of California, have invented new and useful Improvements in Combined Harvesters, of which the following is a specification.

This invention is an improved combined harvester, especially adapted for harvesting ripe wheat, barley and other similar grains, the object being to provide a machine that is lighter and simpler in construction than the ones now in use for that purpose.

The invention consists in the construction, combination and arrangement of devices hereinafter described and claimed.

The primary object of my invention is to construct a combined harvester which eliminates all cutting machinery usually carried by a machine of this character thereby simplifying the construction and producing a more compact and efficient device; and my invention consists of the novel features herein shown, described and claimed.

In the accompanying drawings:

Figure 1 is a side view of a combined harvester constructed in accordance with my invention.

Fig. 2 is a plan view of the same.

Fig. 3 is a perspective detail sectional view of the two cylinders and the reel-belt for making the grain lean backward toward the cylinders.

In accordance with my invention I provide a frame-work #7, in which operate threshing and lifting cylinders 1 and 2, the concave #3, and grain-carrier #6, which must travel in the direction the arrows point. A set of screens or sieves 11 separate the chaff from the grain as hereinafter more fully described. A grain auger 12 mounted in position below the screens 11 carries the clean grain out to the sacker (not shown) mounted on the platform 20. The auger 13 which empties into the return elevator 14, which in turn empties into a spout 15, returns the incompletely threshed grain to the cylinder 1. 16 represents an incased fan or blower which blows the chaff out while the grain passes through the screens 11. 17 represents a brace or support which is adjustable to adjust the reel belt 10 to suit the height of the grain.

18 is a pivotal arm that supports the front end of the reel belt 10 and by virtue of the brace 17 is raised or lowered to adjust said reel belt as hereinbefore described. 19 represents a supporting wheel for the front end of the machine, said wheel being adjustable to vary the distance of the machine frame 7 from the ground. 8 and 9 represent the sprocket wheels over which the chains carrying the reel belt 10 travels. 4 represents a removable casing placed over the cylinder 1 to prevent the grain from wasting.

5 represents the transverse supporting shaft which is journaled to the frame 7 of the machine and upon which the traction wheels 25 are keyed by means of ratchets, said wheels 25 carrying the weight of the machine. A sprocket wheel 23 is keyed to the shaft 5, which through the medium of a chain drives the gear 22, which in turn drives the spur gear 24 keyed upon the shaft upon which the cylinder 1 is mounted. The arrangement of the gears and spurs is such that the shaft 5 drives the cylinder 1 at a high rate of speed.

The drive wheels 25 are connected to the shaft 5 by a dog and ratchet arrangement, (not shown) so that on turning the machine the outside wheel, which rotates faster than the inside wheel, will drive the gears and cylinder 1. The ratchets are arranged to allow either drive wheel to idle when backing and to rotate the shaft 5 when going forward.

In Fig. 2 #20 represents the extension of the frame-work of the machine which forms a platform by boarding it over, upon which the driver's seat and the sacker is placed, but not shown in the drawing. #21 represents means for connecting the machine to the engine when engine power is used, or horses when they are used.

The reel-belt 10 must be driven in the direction of the little arrows and at a rate of speed equal to about twice the rate the machine moves forward over the ground, the movement thereof tending to force the grain back in position to be received by the cylinders 1 and 2.

The cylinder #1 must be driven at a high rate of speed in the direction of the arrow. Cylinder #2 must be driven in the opposite direction at a much slower rate of speed. The cylinder #2 is used to lift the grain when it is badly lodged or down as it is called.

The cylinders #1 and #2 and the concave #3 are secured in a unit which is not shown in the drawing as it is immaterial in what manner this is accomplished. This unit is secured to the frame-work by means of patented bearings already sold in stock, so these also are not represented in the drawings.

The reel belt 10 consists of a series of slats 26 connecting the sprocket chains 27 and 28 and forming an endless belt. The shaft 29 is mounted in the extreme front end of the frame and carries sprocket wheels 8. Side bars 18 are pivotally mounted upon the shaft 29 and extend forwardly in substantially horizontal parallel planes. The shaft 31 is mounted in the forward ends of the side bars 18 and carries the sprocket wheels 9, and the reel belt 10 is mounted with the chains 27 and 28 running over the sprocket wheels 8 and 9. The sprocket wheels 9 are considerably larger than the sprocket wheels 8 and form the extreme front portion of the machine, and the reel belt 10 is connected and operated so that the slats move downwardly at the extreme front of the machine and backwardly on the lower side, so as to catch the tops of the grain and bend them toward the machine. The cylinder 2 is mounted near the forward end of the frame-work 7 and has teeth, the ends of the teeth being close to the slats of the reel belt, and the cylinder 2 is operated with the teeth moving upwardly on the forward side so that as the heads of the standing grain are carried toward the cylinder 2 by the reel belt 10 the heads of the lodged grain are lifted from the ground by the cylinder 2 and the mass is carried to the concave 3 where it is thoroughly threshed, the chaff and grain falling upon the carrier 6. The braces 17 are connected to the pawl wheel shaft 32, and the pawl wheel 33 fixed upon the shaft 32 is engaged by a pawl 34 so as to sustain the weight upon the shaft 31 and so as to adjust the shaft up and down for high or low grain. The braces 17 are preferably leather or canvas straps wound upon the shaft 32.

Special attention is called to the fact that I have produced a harvester comprising a carriage, an endless slatted belt construction pivotally connected to the forward end of the carriage and extending forwardly, a lifting cylinder below the rear end of the belt construction, the adjacent faces of the lifting cylinder and belt moving in the same direction, a conveyer extending from below the cylinder, a concave above and back of the cylinder, and a threshing cylinder in opposition to the concave, the slatted belt construction extending over the heads of standing grain so as to beat the heads downwardly and backwardly against the lifting cylinder, and the lifting cylinder serving to pick up lodged grain, thereby making it possible to pull the heads of wheat and other similar grain from the stalks, thresh the heads, and discharge them to a conveyer, and thereby doing away with the necessity of cutting, handling, and threshing the stalks and weeds and grass.

What I claim and desire to secure by Letters Patent of the United States is:

1. In a harvester, a suitable carriage, a threshing cylinder mounted in the carriage, a threshing concave mounted below and in opposition to the threshing cylinder, a lifting cylinder mounted directly in front of the concave and in opposition to the threshing cylinder, and an endless reel belt construction mounted with its rear end close to the passage between the two cylinders.

2. In a harvester, a suitable carriage, a threshing cylinder mounted in the carriage, a threshing concave mounted below and in opposition to the threshing cylinder, a lifting cylinder mounted directly in front of the concave and in opposition to the threshing cylinder, a pivoted frame connected to the front end of the carriage on a line with the passage between the two cylinders and extending forwardly, means for adjustably supporting the forward end of the frame, and an endless reel belt mounted to travel in the frame.

In testimony whereof, I affix my signature in the presence of two witnesses.

NOAH C. NELSON.

Witnesses:
J. J. ROBERTSON,
R. C. FOSTER.

Copies of this patent may be obtained for five cents each, by addressing the "Commissioner of Patents, Washington, D. C."